April 26, 1949.   O. J. HUELSTER   2,468,630
SEPARABLE FASTENER
Original Filed Sept. 10, 1942

INVENTOR
OTTO J. HUELSTER
BY
Howard E. Thompson
ATTORNEY

Patented Apr. 26, 1949

2,468,630

UNITED STATES PATENT OFFICE 2,468,630

SEPARABLE FASTENER

Otto J. Huelster, Waterbury, Conn., assignor to Scovill Manufacturing Company, Waterbury, Conn., a corporation of Connecticut Original application September 10, 1942, Serial No. 457,817. Divided and this application April 25, 1944, Serial No. 532,640

4 Claims. (Cl. 24—214)

My present invention relates to separable snap fastener assemblies and to the constituent fastener members thereof, and aims to provide certain improvements in such devices.

The conventional types of separable snap fastener assembly consist of a rigid stud member and a resilient socket member suitably affixed to supporting media or sheets, the stud and socket members having complemental parts which may be temporarily engaged and disengaged in the usual manner of snap fasteners. In certain of these types of fastener assemblies the socket member has a resilient tubular portion which is surrounded and protected by a cylindrical wall to prevent injury thereto when a garment provided with such fasteners is passed through a mangle during the laundering thereof. On the stud member, however, the stud projects a considerable distance above the base or securing flange and because of this projection, there is a tendency for the stud, when disposed in unprotected position, to pit the rubber type of wringer rolls when running through garments having such members attached thereto. Further, in certain types of laundry mangles wherein metal rolls are employed, this stud, when disposed in certain positions on garments running through the mangle, are liable to be distorted so severely as to interfere with or even completely destroy its ability to cooperate with the complemental socket member.

My present invention overcomes the above objections by the simple but unobvious expedient of reversing the arrangement of the fastener members, that is, by making the socket member rigid and making the stud member resilient. By making the socket member rigid and preferably of double walled thickness I am enabled to make the socket member of lesser height and of larger diameter than the studs of conventional fasteners and thereby prevent deformation of said socket member and overcome the tendency of said members toward pitting the wringer rolls. I am also enabled to give to the resilient stud member the protection of a second wall to prevent injury or distortion of said member when subjected to wringer or mangle treatment.

The invention also embodies other features of novelty all of which will become more apparent from the detailed description which follows when considered in connection with the accompanying drawings showing several embodiments, and wherein.

This application constitutes a division of a prior application filed by me on September 10, 1942, bearing Serial Number 457,817, now Patent Number 2,367,217.

Figure 1:
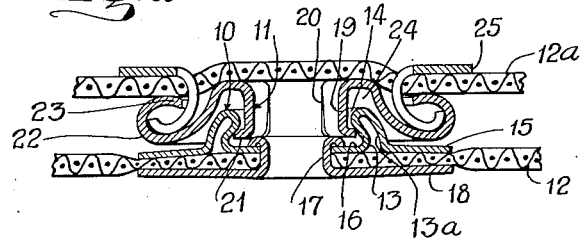
Figure 1 shows a diametrical section through the snap fastener assembly embodying my invention.

Referring first to Fig. 1 of the drawing, the separable snap fastener assembly may be said to consist of a rigid socket member 10 and a resilient stud member 11, said members being suitably affixed to carrying media or sheets 12 and 12a, respectively.

The socket member 10 is rigidly formed by providing an upstanding rim having a double wall thickness as indicated at 13, 13a, said wall being inclined radially inwardly to provide a portion of reduced diameter 14 at its outer rim, the outer wall having a radially outwardly directed flange 15, and the inner wall having a radially inwardly directed flange 16. The socket member may be conveniently secured to the sheet 12 by an eyelet 17 having a flange 18 overlying the flanges 15 and 16 on the socket member and between which latter flanges and the flange 18 the sheet is firmly secured.

The stud member 11 has a central tubular portion 19 which is split along one or more axial lines 20 to provide resilient fingers each of which at its outer or socket engaging end is formed with a radially outwardly directed flange 21 which is adapted to engage behind the rim portion 14 of the socket. Integrally formed with the tubular portion 19 and extending radially outwardly from the inner end thereof and flaring axially outwardly from said inner end is a breast portion 22, the free end of which is reversely turned, as indicated at 23, to provide a retaining ring. The breast portion 22 preferably extends axially beyond the end of the tubular portion 19 and is radially spaced therefrom to form therewith an annular recess 24 within which the tubular portion of the socket member is adapted to be received and confined when the socket member and the stud member are in engaged assembled relation. The stud member may be secured to the sheet 12a by a pronged attaching ring 25 in a manner well known.

Figure 2:
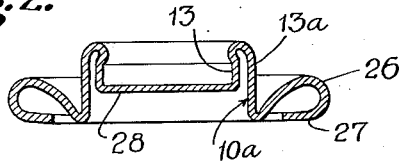
Fig. 2 shows a diametrical section through a modified form of socket member from that shown in Fig. 1 and adapted for cooperative use with the stud member shown in Fig. 1.

In the modified form of socket member 10a shown in Fig. 2 the outer wall 13a of the double wall thickness socket member is formed with a breast portion 26 and reversely curved retaining ring 27 of a character analogous to the breast portion and retaining ring 22 and 23 above described and intended for securing the socket member to a carrying sheet through the medium of a pronged attaching ring analogous to the ring 25. The inner wall 13 of the socket member may have its inner edge or rim reinforced by the integrally formed disc 28.

Figure 3:
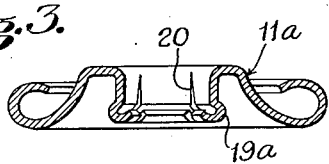
Fig. 3 shows a diametrical section through a modified form of stud member from that shown in Fig. 1, and adapted for cooperative use with the socket members shown in Figs. 1 and 2.

The stud member 11a shown in Fig. 3 is similar in all respects but one to the stud member 11 shown in Fig. 1, the only point of difference being that where in Fig. 1 the outer end of the tubular portion 19 is flanged outwardly, the outer end of the split tubular portion in Fig. 3 or the resilient fingers are each formed as an outwardly directed beaded flange 19a.

Figure 4:
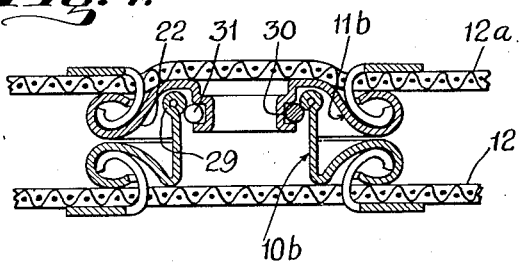
Fig. 4 shows a diametrical section through another modification of the fastener assembly.

In the embodiment of my invention shown in Fig. 4 the socket member 10b instead of being formed with a double wall socket as shown in Figs. 1 and 2, has but a single wall thickness but is reinforced at its outer end or rim with an integral annular bead 29 which provides the rim of the socket at its outer end with a portion of reduced diameter for cooperation with the stud member which is adapted to be received therein. The stud member 11b as shown in Fig. 4 also differs from that shown in Figs. 1 and 3 in that the stud member shown in Fig. 4, instead of having a pluraltiy of spring fingers for engaging within the socket member, is formed with an outwardly directed annular recess 30 within which is mounted a split spring ring 31 having a normal diameter larger than the inner diameter at the rim 29 of the socket member 10b through which it is adapted to be forced in the course of which the diameter of the ring will be reduced, and after passing through the beaded rim 29 will again expand to retain the fastener members in assembled relation.

Considering the various modifications of the stud members hereinbefore described it will be apparent that the stud per se is at all times protected by the breast portion which extends axially beyond the outer end of the stud, and inasmuch as there is at least four thicknesses of metal at the breast portion of the fastener element it will be appreciated that when a garment to which a stud member such as described is attached is passed through a mangle or a wringer the stud member at the breast portion thereof will bear the full force of the compressive action of the rolls and protect the stud from injury or deformation. It will also be apparent that by virtue of the reversal of the parts in my present snap fastener I am enabled to make the socket member of lesser height and of larger diameter than the stud members heretofore made and thus reduce materially the tendency toward pitting the wringer rolls and the distortion or deformation of the socket member by a mangle when garments provided with such socket elements as hereinbefore described are passed through such devices. In the various modifications of the invention as disclosed it will also be noted that both the socket members and the stud members each have a radially outwardly directed portion and that the axial dimensions of said socket and stud members are such that when said members are in engaged assembled relation the radially outwardly directed portions thereof will be in substantially contacting relation and thereby prevent the tilting off of one member from the other. This stability between the assembled fastener members is further enhanced by the fact that when the stud and socket members are in assembled relation the socket engages within and substantially contacts the walls of the annular recess provided in the stud member between the stud proper and the flaring wall of the breast portion. The substantially contacting relation between the radially outwardly directed portion on the respective fastener members when in assembled relation and the disposition of the socket within the annular recess in the stud member also operates to resist any severe lateral strains imposed upon the fastener members and will prevent too much lateral movement of the socket relative to the stud such as would distort the resilient fingers of the stud to any damaging extent and thus prevent deformation or mutilation of the fastener elements should they, in assembled relation on a garment, be passed through the rolls of a mangle in the laundering process.

From the foregoing detailed description it will be understood that I have provided an improved snap fastener assembly which eliminates the objections and deficiencies inherent in conventional types of snap fasteners and accomplishes this in an exceedingly simple manner, and although I have shown and described several embodiments of my improved fastener it is to be understood that I do not wish to be limited to the specific details disclosed since these may be varied within the range of engineering skill without departing from the spirit of my invention as defined in the accompanying claims.

Having fully described my invention, what I claim as new and desire to secure by Letters Patent is:

1. A socket part for snap fasteners comprising a double walled tubular member, both walls of said member being circumferentially continuous to give rigidity thereto, the walls being united at one end in a curved portion extending into the bore of the inner tube to form a stud engaging ridge, the inner tube having an inwardly and radially extending wall portion arranged within the end limits of the outer tube, and said outer tube having an outwardly and radially extending circumferentially continuous portion.

2. A socket part for snap fasteners comprising a double walled tubular member, both walls of said member being circumferentially continuous to give rigidity thereto, the walls being united at one end in a curved portion extending into the bore of the inner tube to form a stud engaging ridge, the inner tube having an inwardly and radially extending wall portion arranged within the end limits of the outer tube, said radial wall having a central aperture, and means including an eyelet engaging the apertured portion of said wall for attaching the socket part to a support.

3. A socket element for a snap fastener, said element comprising an annular curved breast wall part, the periphery of said wall part terminating in a reversely curved portion, said element having a central tubular member one end of which joins the breast wall part, a supplemental tubular member arranged within the first named member and joining the first named member in an annular ridge projecting into the bore of the supplemental tubular member, and said element having a disc integral with the supplemental wall member and forming a closure for one end of the bore thereof.

4. A socket part for snap fasteners, said part comprising a circumferentially continuous tubular member of double wall thickness surrounding a socket opening, the outer wall being gradually inclined inwardly and the inner wall being in the form of a reverse curve and integrally joined to the inner end of said outer wall, part of the curved portion of the inner wall adjacent the joined end defining a restricted opening for said socket as a means for engaging a stud part of a fastener, the free end of the outer wall having an outwardly directed radial flange, and the free end of the inner wall having an inwardly directed flange.

OTTO J. HUELSTER.

REFERENCES CITED

The following references are of record in the file of this patent:

UNITED STATES PATENTS

| Number | Name | Date |
|---|---|---|
| 405,179 | Raymond | June 11, 1889 |
| 664,307 | Young | Dec. 18, 1900 |
| 685,397 | Donchian | Oct. 29, 1901 |
| 1,380,826 | Moss | June 7, 1921 |
| 1,685,061 | Carr | Sept. 18, 1928 |
| 2,310,007 | Wolff | Feb. 2, 1943 |
| 2,312,442 | Reiter | Mar. 2, 1943 |